United States Patent Office 2,870,402
Patented Jan. 20, 1959

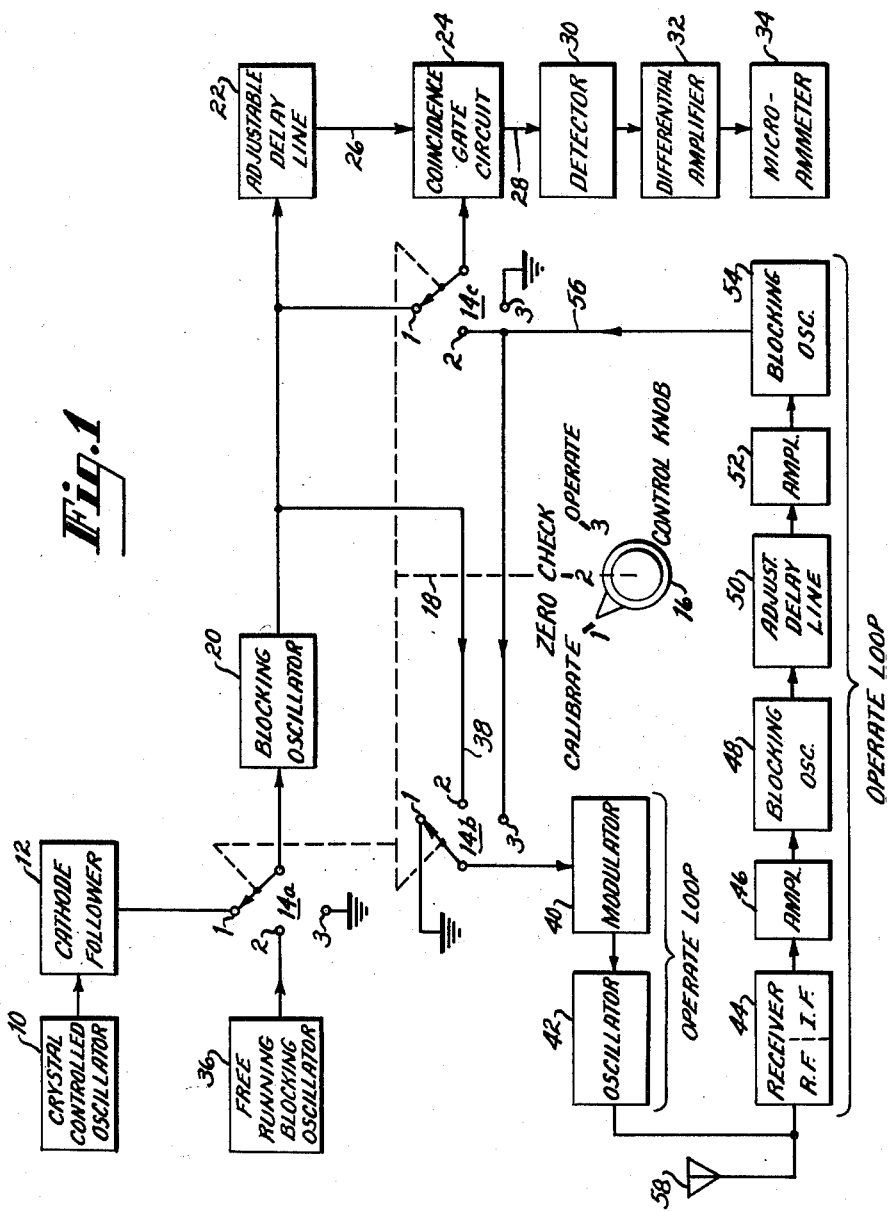

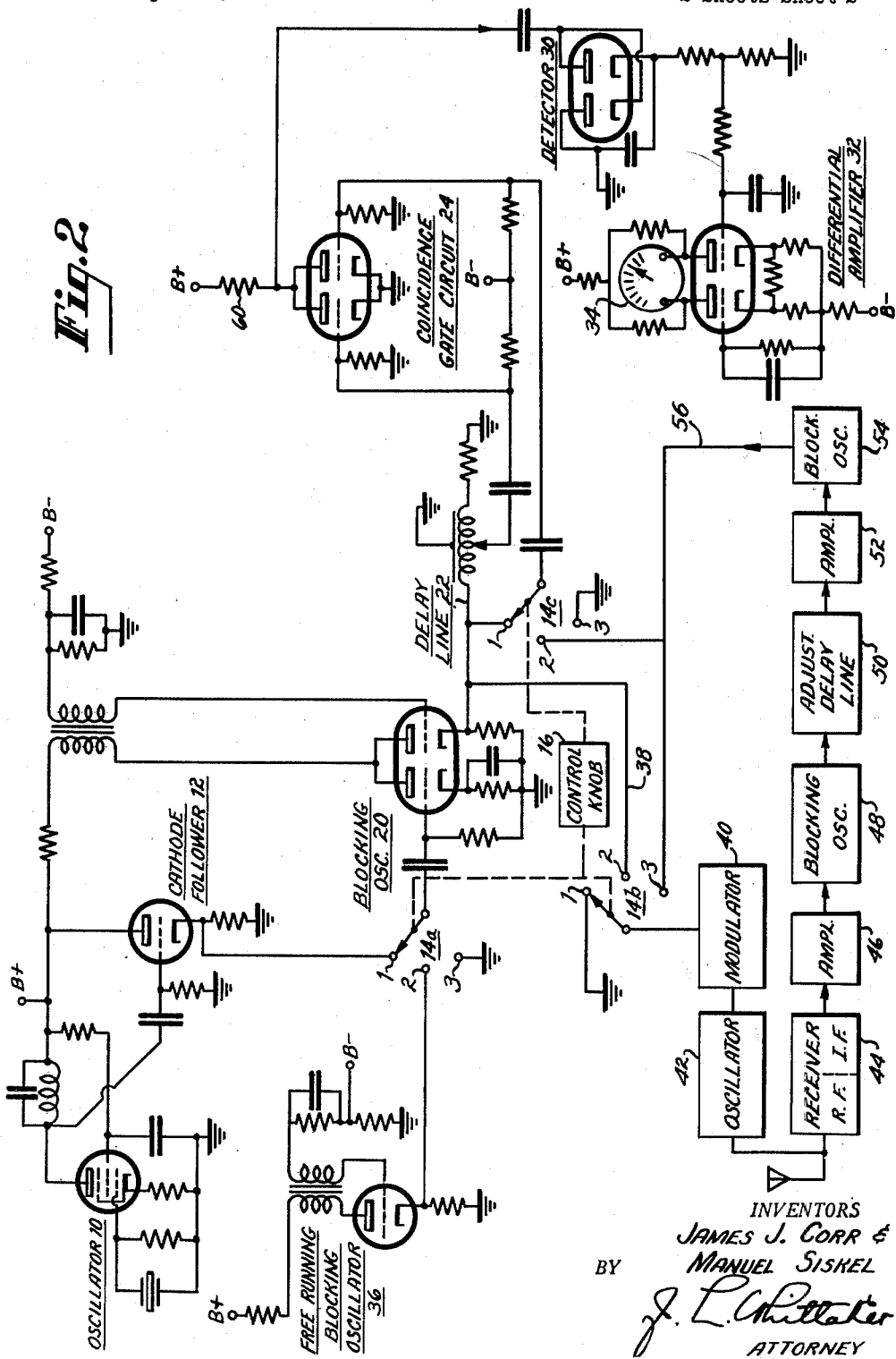

2,870,402

CALIBRATION CIRCUIT

James J. Corr, Stratford, and Manuel Siskel, Camden, N. J., assignors, by mesne assignments, to the United States of America as represented by the Secretary of the Air Force Application September 23, 1955, Serial No. 536,064

4 Claims. (Cl. 324—57)

The present invention relates to an improved arrangement for adjusting to a predetermined value the time delay introduced by a circuit. While not restricted thereto, the invention is particularly applicable to the calibration of shoran ground stations.

In a shoran system, an aircraft, surface vessel or the like transmits pulses of radio frequency energy to a number of ground stations and receives return pulses from the ground stations. The ground stations each include a receiver for receiving the pulses, means responsive to the received pulses for converting them to modulating pulses, and a transmitter triggered by the modulating pulses. These circuits introduce delays. The delays may not be constant from one ground station to another as the circuit parameters may differ at the different stations, and the environmental and electrical conditions may also differ. The delay differences introduce system errors and it is therefore desirable to eliminate such differences. One way of doing this is to add the necessary additional amount of delay to each ground station delay to raise the total amount of delay introduced by each to a standard value.

It is a general object of the present invention to provide an improved calibration arrangement for a circuit such as a ground shoran receiver-transmitter which is simple and inexpensive and is also highly accurate.

A stable oscillator and an adjustable delay means form the basic components of the calibration arrangement of the present invention. The output of the oscillator is converted to pulses spaced from one another the desired, standard time delay interval. The pulses are applied to the input circuit of the delay means and the latter's delay adjusted to the lowest value at which the output pulses from the line occur coincident with the input pulses thereto. The delay introduced is then precisely the standard delay interval. The source of pulses is now disconnected from the adjustable delay means and a second source of pulses connected to the input thereto. These second pulses are spaced from one another intervals greater than that between the first mentioned pulses. The second pulses are also applied to the circuit it is desired to calibrate. The last named circuit includes a second delay means which is adjusted until the output pulses from the circuit being calibrated occur in time coincidence with the output pulses from the first adjustable delay means. The circuit being calibrated then introduces a delay which is precisely the same as the delay provided by the first adjustable delay means—that is, the standard delay interval.

The invention will be described in greater detail by reference to the following description taken in connection with the accompanying drawing in which:

Figure 1 is a block circuit diagram of a preferred embodiment of the present invention; and Figure 2 is a diagram, partially in block and partially in schematic form, of the circuit of Figure 1.

In the figures similar reference numerals refer to similar elements.

Referring to Figure 1, switch 14a is one of a group of three ganged switches 14a, 14b and 14c. Position 1 of the switches is the "calibrate" position; position 2 of the switches is the "zero check" position; and position 3 of the switches is the "operate" position. The switches are operated in unison by a control knob 16 which is mechanically connected to the ganged switches by a mechanical interconnection 18.

When the switches are in position 1, the output of crystal controlled oscillator 10 is applied through cathode-follower 12 to blocking oscillator 20. Assume for the sake of the explanation which follows that it is desired to calibrate the operate loop of a shoran ground station to 1.79 microseconds. In this event, crystal controlled oscillator 10 has an operating frequency of precisely 558.654 kilocycles, whereby one cycle has a period of 1.79 microseconds. The sinusoidal output of cathode-follower 12 is converted by blocking oscillator 20 to a train of very narrow, sharp pulses precisely 1.79 microseconds apart. These are applied by the blocking oscillator to the input circuit of adjustable delay line 22. The pulses are also applied through contact 1 of switch 14c to one of the inputs to coincidence gate circuit 24. The output of the adjustable delay line is applied over lead 26 to the second input to the coincidence gate circuit. If now the delay provided by the adjustable delay line is adjusted to the lowest value at which a peak negative voltage pulse occurs at output lead 28 of the coincidence gate circuit, the delay introduced by the line is precisely 1.79 microseconds. The peak negative voltage pulse is applied through detector 30 and differential amplifier 32 to microammeter 34. A peak reading on the microammeter indicates that the adjustable delay line is set to its correct delay. Preferably the total delay range of delay line 22 is somewhat less than 3.58 microseconds to avoid the possibility of adjusting the line to twice the desired delay.

After delay line 22 is adjusted to its required value, control knob 16 is thrown to position 2 (zero check position) whereby the switches 14a, 14b and 14c, which are controlled by the knob, are also thrown to position 2.

The output frequency of free-running, blocking-oscillator 36 is substantially lower than that of the crystal controlled oscillator. Preferably, the output frequency is on the same order of magnitude as the repetition frequency of the pulses received by the ground shoran station. Free-running, blocking-oscillator 36 need not be especially stable. Its output pulses are applied through contact 2 of switch 14a to blocking-oscillator 20 and the latter in turn supplies its output to the input circuit of adjustable delay line 22. The output pulses of blocking-oscillator 20 are also applied, via lead 38 and contact 2 of switch 14b, to modulator 40. The modulator may be of conventional type and its output triggers oscillator 42. The output frequency of the oscillator is the same as the frequency to which receiver 44 is tuned and therefore the pulses of the former are applied through the radio frequency and intermediate frequency stages of the receiver to amplifier 46 and blocking oscillator 48. The output pulses of the latter are then applied through adjustable delay line 50, amplifier 52, blocking oscillator 54, and lead 56 to contact 2 of switch 14c. Since stages 40, 42, 44, 46, 48, 50, 52 and 54 (the operate-loop of a conventional shoran ground receiver-transmitter) are all conventional and well known to those skilled in the art, they need not be described here in further detail.

When switch 14c is in its "zero-check" position, pulses from blocking oscillator 54 are applied through its contact 2 to coincidence gate circuit 24. The second input to the coincidence gate circuit is via lead 26 from the output of adjustable delay line 22. When adjustable delay line 50 is adjusted to a value such that a negative peak voltage pulse occurs at lead 28, the operate loop of the ground station is adjusted to the standard delay of precisely 1.79 microseconds. The shoran station is now in condition to operate and control knob 16 may be thrown to the "operate" position (3).

In the "operate" position, calibration stages 36, 10, 12, 20, 22, 24, 30, 32 and 34 are effectively out of circuit and the operate loop operates in the conventional manner. In brief, a received signal at antenna 58 is applied through stages 44, 46, 48, 50, 52 and 54 to the modulator 40. The modulator triggers oscillator 42 which supplies high power pulses of radio frequency energy to antenna 58. The latter radiates the same to the aircraft, vessel or the like from which the original pulses were received.

Following the calibration procedure described in the foregoing paragraphs, it has been found possible to adjust the delay of the operate loop of a ground shoran station to 1.79 microseconds plus or minus .01 microsecond. This allows the circuit to maintain a plus or minus .02 microsecond delay accuracy under varying operating conditions.

Figure 2 shows in greater detail various of the stages shown in block form in Figure 1. Oscillator 10 includes a pentode with tuned grid and plate circuits. Its manner of operation is conventional. Cathode follower 12 serves as a buffer between the oscillator and blocking oscillator 20. Blocking oscillator stage 20 includes a first triode which acts as a driver and a second triode which is the blocking oscillator proper. The driver functions to make faster the rise time of blocking oscillator output pulses. If desired, the driver stage may be omitted. The blocking oscillator output is taken from across its cathode and applied to the input end of delay line 22. Preferably, the combined impedance across the input end of the delay line is equal to the characteristic impedance of the delay line and, similarly, the delay line is terminated at its remote end in its characteristic impedance. This is to avoid reflections.

Coincidence gate circuit 24 comprises a pair of triodes. The output pulses of delay line 22 are applied to one of the control grids of the triodes and the voltage pulses with which the former are to be compared are applied to the other control grid. When the pulses applied to the two control grids are in time coincidence, the negative-going voltage pulse appearing across the anode load resistor 60 reaches a maximum amplitude. The indication of maximum amplitude is accomplished by detector 30, differential amplifier 32, and microammeter 34, which are all conventional and need not be described in further detail. The remaining stages in Figure 2 are also conventional. Thus, for example, blocking oscillators 48 and 54 may be similar to oscillator 36 shown at the left center of Figure 2. However, the output frequencies of these oscillators is controlled by stages 46 and 52, respectively. Adjustable delay line 50 may be similar to delay line 22. Preferably, the total delay of adjustable delay line 50 is somewhat under 1 microsecond since the delay usually imparted by the remaining stages of the operate loop is on the order of 1–1.5 microseconds.

Although in the foregoing discussion specific values have been assigned to certain parameters and components, it is to be understood that these are meant merely to be illustrative of the invention and not limiting thereof. Thus, for example, in the arrangement described it is desired to preset the delay in the operate loop to 1.79 microseconds. In other systems it may be desirable to adjust the delay of a circuit to other values greater or less than 1.79 microseconds. In such case it is merely necessary to adjust the frequency output of oscillator 10 to a frequency the period of which is equal to or harmonically related to the desired delay and, if necessary, to use shorter or longer delay lines 22 and 50.

What is claimed is:

1. An arrangement for adjusting to a predetermined amount the delay introduced by a given circuit comprising, in combination, first adjustable delay means having an input circuit and an output circuit; generator means for generating a series of pulses spaced from one another said predetermined amount; means including switch means for applying said pulses to said input circuit of said delay means; means for adjusting the delay provided by said delay means to the lowest value at which the pulses applied to its input circuit occur coincident with those available at its output circuit, whereby the delay provided by said delay means is equal to said predetermined amount; a source of second pulses spaced from one another intervals greater than said predetermined amount; means including said switch means for disconnecting said generator means from said input circuit of said delay means and connecting said source thereto; second adjustable delay means in said given circuit; means for applying said second pulses to the input to said given circuit; and means for adjusting the delay introduced by said second delay means to a value such that an output signal from said given circuit occurs in time coincidence with an output pulse from said first delay means.

2. In an arrangement as set forth in claim 1, said generator means including a crystal controlled oscillator.

3. An arrangement as set forth in claim 1, wherein said means for adjusting includes a coincidence gate circuit for providing an output pulse when said output signal of said circuit is in time coincidence with said output pulse of said first delay means.

4. An arrangement for calibrating the operate loop of a ground shoran station comprising, in combination, a first adjustable delay line; generator means for generating a series of pulses spaced from one another predetermined intervals of time; switch means for applying said pulses to the input of said first delay line; means for adjusting the delay provided by said delay line to the lowest value such that the pulses applied to the input thereof occur coincident with those available at the output thereof, whereby the delay provided by said delay line is equal to said predetermined interval of time; a source of second pulses spaced intervals from one another substantially greater than said predetermined interval of time; a second adjustable delay line in said operate loop of said shoran station; means including said switch means for disconnecting said generator means from the input of said first delay line and connecting said source thereto; means for applying said second pulses to said operate loop of said ground shoran station; a coincidence gate circuit; means for applying the output of said operate loop and the output of said first adjustable delay line to said coincidence gate circuit; and means for adjusting the adjustable delay line in said operate loop to a value such that there is produced at the output of said coincidence gate circuit a pulse signal which is a result of two input pulses thereto in time coincidence.

References Cited in the file of this patent

UNITED STATES PATENTS

| | | |
|---|---|---|
| 2,478,208 | Rothman et al. | Aug. 9, 1949 |
| 2,604,622 | Hasbrook | July 22, 1952 |